United States Patent
Gauthier et al.

(10) Patent No.: US 6,775,638 B2
(45) Date of Patent: Aug. 10, 2004

(54) POST-SILICON CONTROL OF AN EMBEDDED TEMPERATURE SENSOR

(75) Inventors: Claude Gauthier, Fremont, CA (US); Brian Amick, Austin, TX (US); Spencer Gold, Pepperell, MA (US); Pradeep Trivedi, Sunnyvale, CA (US); Lynn Ooi, Santa Clara, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 135 days.

(21) Appl. No.: 10/131,287

(22) Filed: Apr. 24, 2002

(65) Prior Publication Data

US 2003/0204358 A1 Oct. 30, 2003

(51) Int. Cl.[7] .......................... G01K 1/00; G01K 11/00
(52) U.S. Cl. ..................................................... 702/130
(58) Field of Search ............................. 374/141, 163, 374/170, 171, 1; 702/85, 99, 104, 116, 130, 132, 136; 327/540

(56) References Cited

U.S. PATENT DOCUMENTS

| | | | |
|---|---|---|---|
| 5,856,742 A | * 1/1999 | Vulih et al. | 323/315 |
| 5,961,215 A | * 10/1999 | Lee et al. | 374/178 |
| 6,011,422 A | * 1/2000 | Koglin et al. | 327/357 |
| 6,150,872 A | * 11/2000 | McNeill et al. | 327/539 |
| 6,157,244 A | * 12/2000 | Lee et al. | 327/539 |
| 6,377,110 B1 | * 4/2002 | Cooper | 327/513 |
| 6,583,667 B1 | * 6/2003 | Dasgupta et al. | 330/254 |
| 2002/0125929 A1 | * 9/2002 | Chen et al. | 327/175 |
| 2002/0163379 A1 | * 11/2002 | Kimura | 327/540 |

* cited by examiner

Primary Examiner—John Barlow
Assistant Examiner—Demetrius Pretlow
(74) Attorney, Agent, or Firm—Osha & May L.L.P.

(57) ABSTRACT

A temperature sensor adapted to produce a temperature-independent voltage and temperature-dependent voltage dependent on an internal control signal, generated within the temperature sensor, adjustable by an adjustment circuit operatively connected to the temperature sensor is provided. The adjustment circuit is controllable to adjust the internal control signal in order to modify an operating characteristic of the temperature sensor.

31 Claims, 5 Drawing Sheets

US 6,775,638 B2

POST-SILICON CONTROL OF AN EMBEDDED TEMPERATURE SENSOR

BACKGROUND OF INVENTION

As shown in FIG. 1, a typical computer system 10 includes at least a microprocessor 12 and some form of memory 14. The microprocessor 12 has, among other components, arithmetic, logic, and control circuitry that interpret and execute instructions necessary for the operation and use of the computer system 10. Specifically, FIG. 1 shows the computer system 10 having the microprocessor 12, memory 14, integrated circuits (ICs) 16 that have various functionalities, and communication paths 18, i.e., buses and wires, that are necessary for the transfer of data among the aforementioned components of the computer system 10.

As integrated circuit elements continue to get smaller and as more circuit elements are packaged into an integrated circuit, integrated circuits dissipate increased amounts of power, which in turn leads to increased operating temperatures. Increased operating temperatures are generally undesirable because increased temperatures increase the likelihood for performance degradation. Thus, it is becoming increasingly important to know the temperature parameters in which a particular integrated circuit, or portion thereof, operates.

The temperature in a microprocessor is typically measured by generating a voltage proportional to temperature. Such a voltage is referred to as a "temperature-dependent voltage." In many cases, it is also useful to generate a "temperature-independent voltage," i.e., a temperature-insensitive voltage measurement, that may be processed along with the temperature-dependent voltage to allow for cancellation of process and power supply variations. One technique for generating a temperature-independent voltage and a temperature-dependent voltage involves the use of a circuit known in the art as a "temperature-independent and temperature-dependent voltage generator" ("TIDVG"). A TIDVG generates (1) a temperature-dependent voltage representative of a temperature at a point on an integrated circuit on which the TIDVG resides and (2) a temperature-independent voltage that is used to cancel out process and power supply variations inherent in the temperature-dependent voltage measurement.

SUMMARY OF INVENTION

According to one aspect of the present invention, an integrated circuit comprises: a temperature sensor including an amplifier stage adapted to output an internal control signal, a startup stage operatively connected to the amplifier stage, the startup stage being adapted to selectively control the internal control signal, and an output stage adapted to output a temperature-independent voltage and a temperature-dependent voltage dependent on the internal control signal; and an adjustment circuit operatively connected to the amplifier stage, the adjustment being controllable to adjust the internal control signal.

According to another aspect, a temperature sensor comprises: an amplifier stage adapted to output an internal control signal, the internal control signal being adjustable using an adjustment circuit operatively connected to the amplifier stage; a startup stage operatively connected to the amplifier stage, the startup stage being adapted to selectively control the internal control signal; and an output stage adapted to output a temperature-independent voltage and a temperature-dependent voltage dependent on the internal control signal.

According to another aspect, a method for post-silicon adjustment of a temperature sensor comprises: generating an internal control signal using an amplifier stage; generating a temperature-independent voltage depending on the internal control signal; generating a temperature-dependent voltage depending on the internal control signal; and selectively adjusting the internal control signal using an adjustment circuit operatively connected to the amplifier stage.

According to another aspect, an integrated circuit comprises: amplifier means for generating an internal control signal for a temperature sensor; first generating means for generating a temperature-dependent voltage dependent on the internal control signal; second generating means for generating a temperature-independent voltage dependent on the internal signal; and adjusting means for adjusting the internal control signal, the adjusting means being operatively connected to the amplifier means.

Other aspects and advantages of the invention will be apparent from the following description and the appended claims.

DETAILED DESCRIPTION

Embodiments of the present invention relate to a temperature sensor and an adjustment circuit, where the adjustment circuit is controllable to adjust an operating characteristic of the temperature sensor. Embodiments of the present invention further relate to an integrated circuit that has a temperature-independent and temperature-dependent voltage generator and an adjustment circuit, where the adjustment circuit is controllable to adjust a control signal within the temperature-independent and temperature-dependent voltage generator. Embodiments of the present invention further relate to a post-silicon method for modifying the operation of a temperature-independent and temperature-dependent voltage generator by adjusting a current of a control signal within the temperature-independent and temperature-dependent voltage generator.

Figure 1:
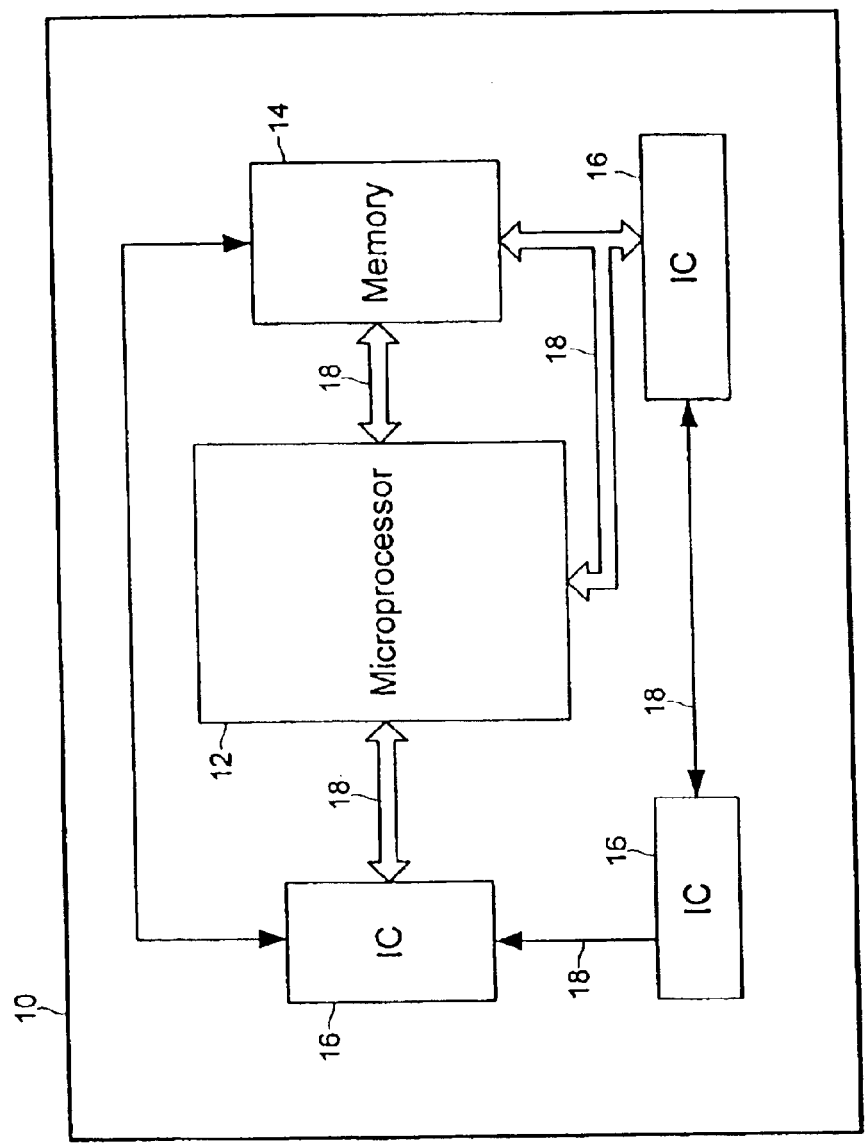
FIG. 1 shows a typical computer system.
Figure 2:
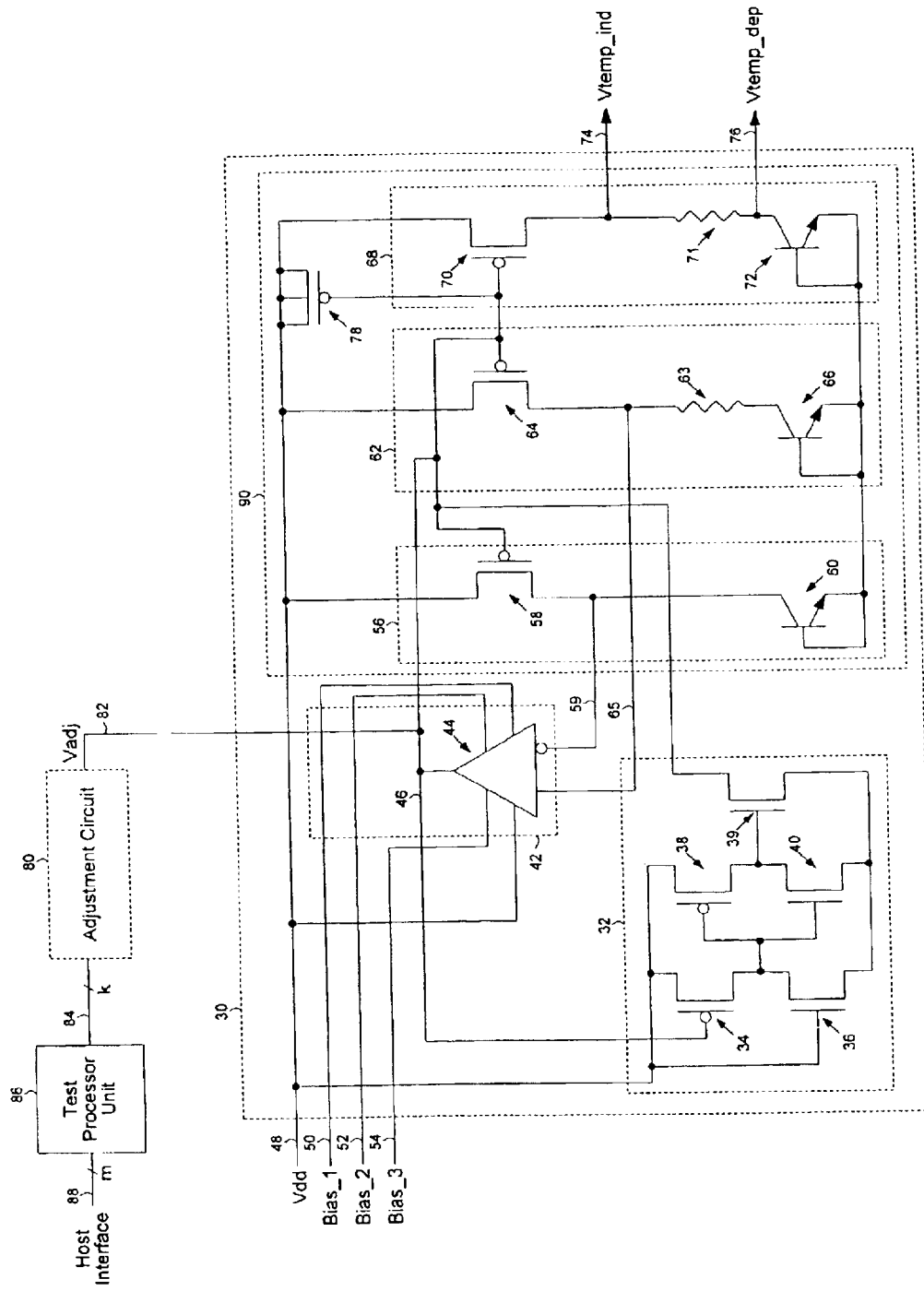
FIG. 2 shows a temperature sensor and an adjustment circuit in accordance with an embodiment of the present invention.

FIG. 2 shows a temperature sensor 30 and an adjustment circuit 90 in accordance with an exemplary embodiment of the present invention. In a general sense, the temperature sensor 30 includes a startup stage 32, an amplifier stage 42, and an output stage 80. The output stage 90 functions as a voltage generator and the startup and amplifier stages 32 and 42 function as support circuitry for the output stage 90. In addition to the circuitry in the aforementioned stages of the temperature sensor 30, the temperature sensor 30 is operatively connected to a power supply Vdd 48. Moreover, the temperature sensor 30 outputs a temperature-independent voltage Vtemp_ind 74 and a temperature-dependent voltage Vtemp_dep 76.

The startup stage 32 includes (1) a first inverter formed by transistors 34 and 36, (2) a second inverter operatively connected to an output of the first inverter where the second inverter is formed by transistors 38 and 40, and (3) a transistor 39 operatively connected to an output of the second inverter. A non-gate terminal of transistor 39 serves as an output of the startup stage 32 and an input to the output stage 90.

The startup stage 32 operates to ensure that the output stage 90 functions correctly. The output stage 90 of the temperature sensor 90 has two stable operating states: (1) a state in which there is a stable current flow; and (2) a state in which there is no current flow, i.e., a no-current state. The startup stage 32 ensures that the output stage 90 remains in the former state, i.e., the state in which current flow is stable, by being responsive to an internal control signal 46 such that the internal control signal 46 does not cause the output stage 90 to remain in a no-current flow state. When the startup stage 32 senses that the internal control signal 46 is causing or may cause the output stage 90 to enter a no-current flow state, transistors 34 and 36 temporarily act to drive an input to the output stage 90 out of the no-current flow state. Specifically, if the internal control signal 46 goes above a particular threshold, transistor 36 causes the first inverter to output low, where after transistor 38 causes the second inverter to output high to transistor 39, which, in turn, drives the output of the startup stage 32 and the input to the output stage 90 low. By driving the input to the output stage 90 to a particular value, the startup stage 32 ensures that the temperature sensor 30 outputs a valid temperature-independent voltage Vtemp_ind 74 and a valid temperature-dependent voltage Vtemp_dep 76.

The amplifier stage 42 of the temperature sensor 30 includes an operational amplifier 44. The operational amplifier 44 is responsive to Vdd 48 and internal bias signals BIAS_1 50, BIAS_2 52, and BIAS_3 54. Inputs to the operational amplifier 44 include a first branch voltage 59 from the output stage 90 and a second branch voltage 65 also from the output stage 90. The operational amplifier 44 operates to correct any error in voltage between the first and second branch voltages 59 and 65. In other words, the operational amplifier 44 seeks to make the difference in voltage between the first and second branch voltages 59 and 65 equal to zero and outputs an error-connected voltage as the internal control signal 46.

The output stage 90 includes (1) a first branch 56, (2) a second branch 62, and (3) a third branch 68. The first, second, and third branches 56, 62, and 68 each include a metal-oxide semiconductor transistor 58, 64, and 70 and a bipolar transistor 60, 66, and 72. The second branch 62 includes a resistor 63, and the third branch 68 includes a resistor 71 and a transistor-formed decoupling capacitor 78, where the capacitor 78 is used to remove power supply noise from, i.e., stabilize, the internal control signal 46. Those skilled in the art will appreciate that, in some embodiments, the resistors 63 and 71 may be implemented using n-well resistors. Transistors 58, 64, and 70 are dependent on Vdd 48, whereas bipolar transistors 60, 66, and 72 are dependent on transistors 58, 64, and 70. Each of the transistors 58, 64, and 70 functions as a branch current source that drives a current.

Because transistors 58, 64, and 70 may be equal in size, they drive branch source currents that are substantially equal in value. Each bipolar transistor 60, 66, and 72 has a base-emitter voltage, $V_{BE}$, dependent on the size of its emitter area. $V_{BE}$ may be calculated using Equation (1):

$$V_{BE} = \frac{kT}{q}\ln\left(\frac{Ic}{Is}\right), \tag{1}$$

where k and q represent physical constants, T represents temperature, $I_C$ represents the current through the bipolar transistor's collector, and $I_S$ represents the saturation current of the bipolar transistor.

Together, the first branch 56 and the second branch 62 form a $\Delta V_{BE}$ current source. The $\Delta V_{BE}$ current source is based on the differential voltage between transistor 60 and transistor 66 with emitter area factors differing by a ratio of x. Accordingly, the value of $\Delta V_{BE}$ may be approximated using Equation (2):

$$\Delta V_{BE} = \frac{kT}{q}\ln(x(1+\varepsilon)), \tag{2}$$

where k and q represent physical constants, T represents temperature, x represents a ratio of the emitter areas of bipolar transistors 60 and 66, and 1+ε represents the ratio of the currents of the first branch 56 and the second branch 62. As shown by Equation (2), $\Delta V_{BE}$ (also referred to as "differential $V_{BE}$ voltage") is dependent on ratio x. The operational amplifier 44 is used to provide feedback via the internal control signal 46 to the $\Delta V_{BE}$ current source, thereby counteracting process variations and channel-length modulation. In some embodiments of the present invention, the emitter areas of the bipolar transistors 60 and 66 may differ in size by a factor of 10, i.e., the emitter area of bipolar transistor 60 is 10 times larger than the emitter area of bipolar transistor 66.

The first branch voltage 59 is equal to the $V_{BE}$ of bipolar transistor 60, and the second branch voltage 65 is equal to the $V_{BE}$ of bipolar transistor 66 plus the voltage across resistor 63. Thus, the second branch voltage 65 may be determined using Equation (3):

$$BV_2 = V_{BE2} + I_2 R_2, \tag{3}$$

where $BV_2$ represents the second branch voltage 65, $VB_{E2}$ represents, the $V_{BE}$ of bipolar transistor 66, $I_2$ represents the current through resistor 63, and $R_2$ represents the value of resistor 63. Because $R_2$ is constant, using the operational amplifier 44 to equalize the difference in voltage between the first branch voltage 59 and the second branch voltage 65 allows an exact value to be determined for $I_2$.

The third branch 68 uses the $\Delta V_{BE}$ current source formed by the first and second branches 56 and 62 to generate two outputs: the temperature-independent voltage Vtemp_ind 74 and the temperature-dependent voltage Vtemp_dep 76. The value of the temperature-independent voltage Vtemp_ind 74 is equal to the sum of the temperature-dependent voltage Vtemp_dep 76 and the voltage across resistor 71. Transistor 70 is substantially equal in size to transistor 64. As a result, the current though transistor 70 is substantially equal to the current through transistor 64 (a technique or effect known as a "current mirror"). In addition, because the temperature-independent voltage Vtemp_ind 74 and the temperature-dependent voltage Vtemp_dep 76 are outputted from the same branch, power supply variations are equally coupled to both voltages Vtemp_ind 74 and Vtemp_dep 76, thereby allowing for supply variation cancellation.

One may show that the temperature-independent voltage Vtemp_ind 74 is a stable voltage using Equation (4):

$$\text{Vtemp\_ind} = V_{BE3} + \frac{nxR_1}{mxR_2} \times \frac{kT}{q} \ln x, \quad (4)$$

where k, T, q, and x have the same representations as in Equation (2), n and m represents constants, $V_{BE3}$ represents the $V_{BE}$ of transistor 72, $R_1$ represents the value of resistor 63, and $R_2$ represents the value of resistor 71. As seen from Equation (4), the determination of Vtemp_ind 74 involves the essential cancellation of a negative temperature coefficient and a positive temperature coefficient. Further, if $R_1$ and $R_2$ are substantially equal, they cancel each other out in Equation (4), thereby having no effective effect on Vtemp_ind 74.

As shown in FIG. 2, an adjustment circuit 80 is operatively connected to the internal control signal 46. A detailed discussion of the adjustment circuit 80 is given below with reference to FIG. 5. The adjustment circuit 80 outputs an adjustment control voltage Vadj 82 that is wire-ORed to the internal control signal 46. By adjusting the internal control signal 46 via adjusting the adjustment control voltage 82, an operating characteristic, e.g., bandgap, of the temperature sensor 30 may be modified to desirably vary/control the generation of the temperature-independent voltage Vtemp_ind 74 and the temperature-dependent voltage Vtemp_dep 76.

In FIG. 2, a test processor unit 86 controls the adjustment circuit 80 using k control signals 84. The values of the k control signals 84 may be determined by the contents of registers or other storage devices maintained in the test processor unit 86. In some embodiments, the test processor unit 86 may be accessed through a host interface, where the host interface communicates with the test processor unit 86 via m communication lines 88.

Those skilled in the art will appreciate that the host interface and the m communication lines 88 may be implemented using one or more of a variety of forms. For example, the host interface may be operated from a computer system distinct from the one in which the temperature sensor 30 resides. In some embodiments, the communication occurring on the host interface and m communication lines 88 may be defined by an industry standard such as JTAG (IEEE 1149).

In some embodiments, more than one test processor unit may be used to control the adjustment circuit 80. In some embodiments, an adjustment circuit may be controlled by a particular test processor unit or a group of test processor units. As will be discussed below with reference to FIGS. 3 and 4, in some embodiments, one or more of the internal bias signals BIAS_1 50, BIAS_2 52, and BIAS_3 54 and/or the internal control signal 46 may be connected to a different number of adjustment circuits than the amounts shown in FIG. 2.

Figure 3:
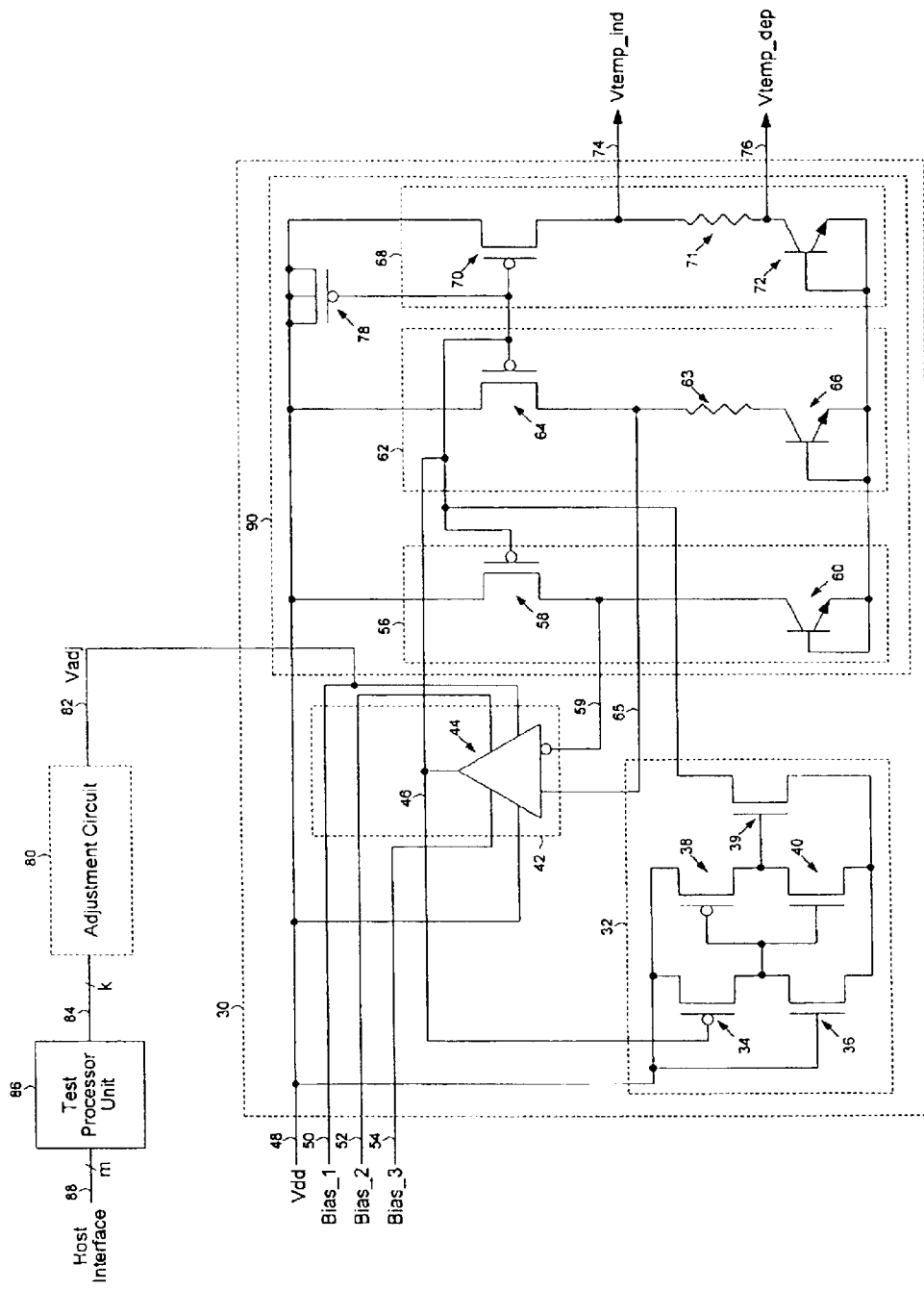
FIG. 3 shows a temperature sensor and an adjustment circuit in accordance with an embodiment of the present invention.

FIG. 3 shows the temperature sensor 30 and adjustment circuit 80 of FIG. 2 in accordance with another exemplary embodiment of the present invention. In FIG. 3, the adjustment control voltage Vadj 82 is operatively connected, e.g., wire-ORed, to internal bias signal BIAS_1 50. Accordingly, by adjusting the internal bias signal BIAS_1 50 via adjusting the adjustment control voltage Vadj 82, a behavior of the operational amplifier 44 is modified, thereby adjusting the internal control signal 46, which is operatively connected to an output of the operational amplifier 44.

Figure 4:
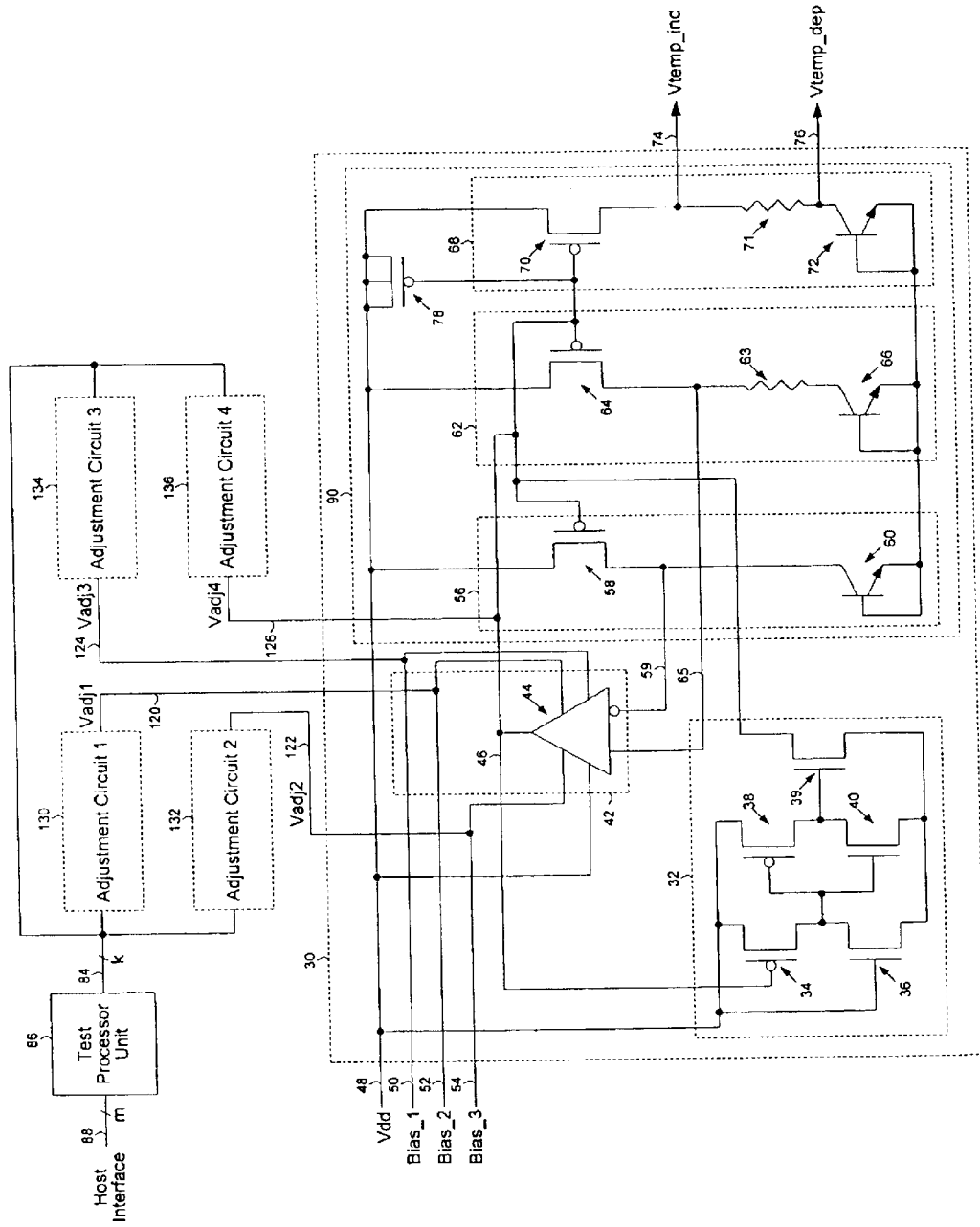
FIG. 4 shows a temperature sensor and adjustment circuits in accordance with an embodiment of the present invention.

FIG. 4 shows the temperature sensor 30 and adjustment circuits 130, 132, 134, and 136 in accordance with another exemplary embodiment of the present invention. In FIG. 4, adjustment control voltages Vadj1 120, Vadj2 122, Vadj3 124, and Vadj4 126, generated by adjustment circuits 130, 132, 134, and 136, respectively, are operatively connected to internal bias signals BIAS_2 52, BIAS_3 54, and BIAS_1 50, and internal control signal 46, respectively. Accordingly, by adjusting the internal bias signals BIAS_1 50, BIAS_2 52, and BIAS_3 54 and internal control signal 46 via adjusting adjustment control voltages Vadj1 120, Vadj2 122, Vadj3 124, and Vadj4 126, a behavior of the operational amplifier 44 and internal control signal 46 is modified, thereby ultimately adjusting the internal control signal 46 to which the generation of the temperature-independent voltage Vtemp_ind 74 and the temperature-dependent voltage Vtemp_dep 76 is responsive.

Figure 5:
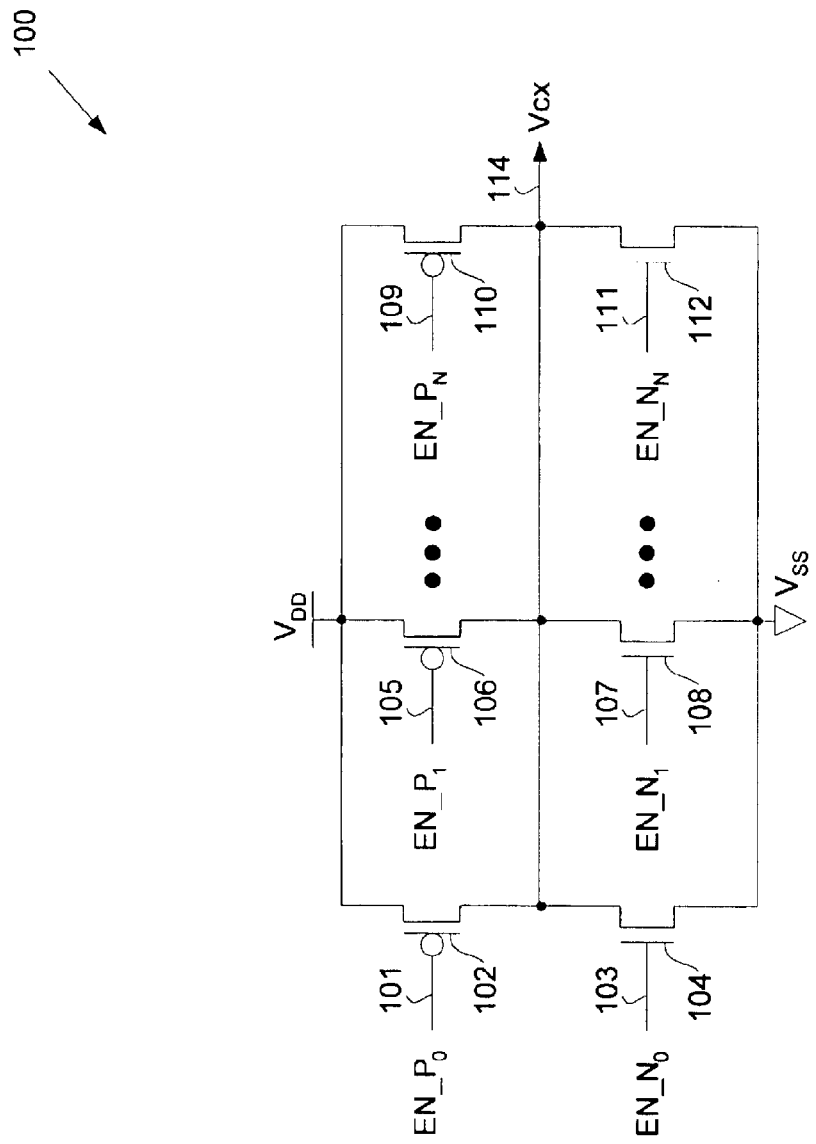
FIG. 5 shows an adjustment circuit in accordance with an embodiment of the present invention.

FIG. 5 shows an exemplary adjustment circuit 100 in accordance with an embodiment of the present invention. Those skilled in the art will understand that the adjustment circuit 100 shown in FIG. 5 is representative of the adjustment circuits shown in FIGS. 2, 3, and 4.

In FIG. 5, the adjustment circuit 100 includes p-channel transistors 102, 106, and 110 arranged in parallel with each other. The p-channel transistors 102, 106, and 110 connect between a power supply, Vdd, and a common node, Vcx 114. The common node Vcx 114 corresponds to adjustment control voltage Vadj 82 shown in FIGS. 2 and 3 and adjustment control voltages Vadj1 120, Vadj2 122, Vadj3 124, and Vadj4 126 shown in FIG. 4. Referring back to FIG. 5, the adjustment circuit 100 also includes n-channel transistors 104, 108, and 112 arranged in parallel with each other. The n-channel transistors 104, 108, and 112 connect between ground, Vss, and the common node Vcx 114. The p-channel transistors 102, 106, and 110 are controlled by control signals EN_P$_0$ 101, EN_P$_1$ 105, and EN_P$_N$ 109, respectively. The n-channel transistors 104, 108, and 112 are controlled by control signals EN_N$_0$ 103, EN_N$_1$ 107, and EN_N$_N$ 111, respectively. A low voltage on any of the EN_P signals 101, 105, and 109 will turn 'on' their respective p-channel transistors 102, 106, and 110. A high voltage on any of the EN_N signals 103, 107, and 111 will turn 'on' their respective n-channel transistors 104, 108, and 112.

Any p-channel transistor 102, 106, and 110 that is 'on' will have a tendency to increase the voltage on Vcx 114 toward Vdd. Any n-channel transistor 104, 108, and 112 that is 'on' will have a tendency to lower the voltage on Vcx 114 toward Vss. By selecting which p-channel transistors 102, 106, and 110 and/or n-channel transistors 104, 108, and 112 are 'on,' a change in the voltage on Vcx 114 may be achieved.

It should be understood that the p-channel transistors 102, 106, and 110 and n-channel transistors 104, 108, and 112 may be turned 'on' individually or as a group. The p-channel transistors 102, 106, and 110 and n-channel transistors 104, 108, and 112 may be sized so that each transistor has a different effect as compared to the other transistors, e.g., a transistor's gate width may be varied to adjust the strength of the transistor. The gate widths may be designed to provide a linear, exponential, or other function as more transistors are turned 'on.' The p-channel transistors 102, 106, and 110 and n-channel transistors 104, 108, and 112 may be sized so that each transistor has an inherently resistive nature, e.g., a transistor's gate length may be increased ('long-channel' transistors) to increase the inherent resistance of the transistor. A larger inherent resistance may be advantageous if both a p-channel transistor and a n-channel transistor are 'on' simultaneously. In other embodiments, the adjustment circuit 100 may include only one p-channel transistor and one n-channel transistor connected in series.

The k control signals 84 in FIGS. 2, 3, and 4 may represent EN_N signals 103, 107, and 111 in FIG. 5 and EN_P signals 101, 105, and 109 in FIG. 5. In other words, the k control signals 84 in FIGS. 2, 3, and 4 are used to turn 'on' or 'off' the p-channel transistors 102, 106, and 110 in FIG. 5 and n-channel transistors 104, 108, and 112 in FIG. 5.

Advantages of the present invention may include one or more of the following. In some embodiments, because an adjustment circuit is operatively connected to a temperature sensor adapted to generate a temperature-independent voltage and a temperature-dependent voltage, an operating characteristic of the temperature sensor may be adjusted in order to achieve a desired performance level.

In some embodiments, because a control signal of a temperature sensor adapted to generate a temperature-independent voltage and a temperature-dependent voltage is operatively connected to an adjustment circuit, an operating characteristic of the temperature sensor is adjustable after the temperature sensor has been fabricated, thereby saving expensive monetary and temporal costs that would otherwise be necessary if the temperature sensor had to be redesigned or physically repaired.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An integrated circuit, comprising:
    a temperature sensor comprising:
        an amplifier stage adapted to output an internal control signal,
        a startup stage operatively connected to the amplifier stage, the startup stage being adapted to selectively control the internal control signal, and
        an output stage adapted to output a temperature-independent voltage and a temperature-dependent voltage dependent on the internal control signal; and
    an adjustment circuit operatively connected to the amplifier stage, the adjustment being controllable to adjust the internal control signal.

2. The integrated circuit of claim 1, the amplifier stage comprising an operational amplifier.

3. The integrated circuit of claim 2, the adjustment circuit being operatively connected to an output of the operational amplifier.

4. The integrated circuit of claim 2, the operational amplifier having a bias input.

5. The integrated circuit of claim 4, the adjustment circuit being operatively connected to the bias input.

6. The integrated circuit of claim 1, the output stage comprising an element substantially sensitive to temperature, the temperature-dependent voltage being responsive to the element.

7. The integrated circuit of claim 1, the output stage comprising an element substantially insensitive to temperature, the temperature-independent voltage being responsive to the element.

8. The integrated circuit of claim 1, the adjustment circuit comprising:
    a first device adapted to facilitate current flow between a power supply and an output of the adjustment circuit; and
    a second device adapted to facilitate current flow between the output of the adjustment circuit and ground.

9. The integrated circuit of claim 8, the first device comprising a p-channel transistor, the second device comprising an n-channel transistor, the p-channel transistor and the n-channel transistor being arranged in series.

10. The integrated circuit of claim 8, the adjustment circuit further comprising a third device arranged in parallel with the first device.

11. The integrated circuit of claim 10, the first device having a longer channel than the third device.

12. The integrated circuit of claim 10, the first device having a greater gate width than the third device.

13. The integrated circuit of claim 8, the first adjustment circuit comprising a third device arranged in parallel with the second device.

14. The integrated circuit of claim 13, the second device having a longer channel than the third device.

15. The integrated circuit of claim 13, the second device having a greater gate width than the third device.

16. A temperature sensor, comprising:
    an amplifier stage adapted to output an internal control signal, the internal control signal being adjustable using an adjustment circuit operatively connected to the amplifier stage;
    a startup stage operatively connected to the amplifier stage, the startup stage being adapted to selectively control the internal control signal; and
    an output stage adapted to output a temperature-independent voltage and a temperature-dependent voltage dependent on the internal control signal.

17. The temperature sensor of claim 16, the amplifier stage comprising an operational amplifier.

18. The temperature sensor of claim 17, the adjustment circuit being operatively connected to an output of the operational amplifier.

19. The temperature sensor of claim 18, the adjustment circuit comprising:
    a first device adapted to facilitate current flow between a power supply and the output of the operational amplifier; and
    a second device adapted to facilitate current flow between the output of the operational amplifier and ground.

20. The temperature sensor of claim 17, the operational amplifier having a bias input.

21. The temperature sensor of claim 20, the adjustment circuit being operatively connected to the bias input.

22. The temperature sensor of claim 16, the output stage comprising an element substantially sensitive to temperature, the temperature-dependent voltage being responsive to the element.

23. The temperature sensor of claim 16, the output stage comprising an element substantially insensitive to temperature, the temperature-independent voltage being responsive to the element.

24. A method for post-silicon adjustment of a temperature sensor, comprising:
    generating an internal control signal using an amplifier stage;
    generating a temperature-independent voltage depending on the internal control signal;
    generating a temperature-dependent voltage depending on the internal control signal; and
    selectively adjusting the internal control signal using an adjustment circuit operatively connected to the amplifier stage.

25. The method of claim 24, the amplifier stage comprising an operational amplifier.

26. The method of claim 25, the adjustment circuit being operatively connected to an output of the operational amplifier, the selectively adjusting comprising:

selectively facilitating current flow between a power supply and the output of the operational amplifier; and selectively facilitating current flow between the output of the operational amplifier and ground.

27. The method of claim 25, the operational amplifier having a bias input.

28. The method of claim 27, the adjustment circuit being operatively connected to the bias input.

29. The method of claim 24, the output stage comprising an element substantially sensitive to temperature, the temperature-dependent voltage being responsive to the element.

30. The method of claim 24, the output stage comprising an element substantially insensitive to temperature, the temperature-independent voltage being responsive to the element.

31. An integrated circuit, comprising:

amplifier means for generating an internal control signal for a temperature sensor;

first generating means for generating a temperature-dependent voltage dependent on the internal control signal;

second generating means for generating a temperature-independent voltage dependent on the internal signal; and adjusting means for adjusting the internal control signal, the adjusting means being operatively connected to the amplifier means.

* * * * *

UNITED STATES PATENT AND TRADEMARK OFFICE
CERTIFICATE OF CORRECTION

PATENT NO.   : 6,775,638 B2                                     Page 1 of 1
DATED        : August 10, 2004
INVENTOR(S)  : Claude R. Gauthier et al.

It is certified that error appears in the above-identified patent and that said Letters Patent is hereby corrected as shown below:

Column 7,
Line 39, please insert -- , wherein the amplifier stage provides feedback to the output stage via the internal control signal -- between the words "signal" and "; and".

Column 8,
Line 27, please insert -- , wherein the amplifier stage provides feedback to the output stage via the internal control signal -- after the word "signal".
Line 59, please insert -- , wherein generating the temperature-independent voltage and generating the temperature-dependent voltage is dependent on feedback provided by the amplifier stage via the internal control signal -- between the words "signal" and "; and".

Column 10,
Line 10, please insert -- , wherein the amplifier means provides feedback to the first generating means and the second generating means via the internal control signal -- between the words "signal" and "; and".

Signed and Sealed this

Eleventh Day of January, 2005

JON W. DUDAS
*Director of the United States Patent and Trademark Office*